Aug. 1, 1933.  F. H. DRIGGS  1,920,638
METHOD OF PREPARING OXIDE FREE METAL CONTAINING NO VOIDS
Filed Feb. 6, 1932
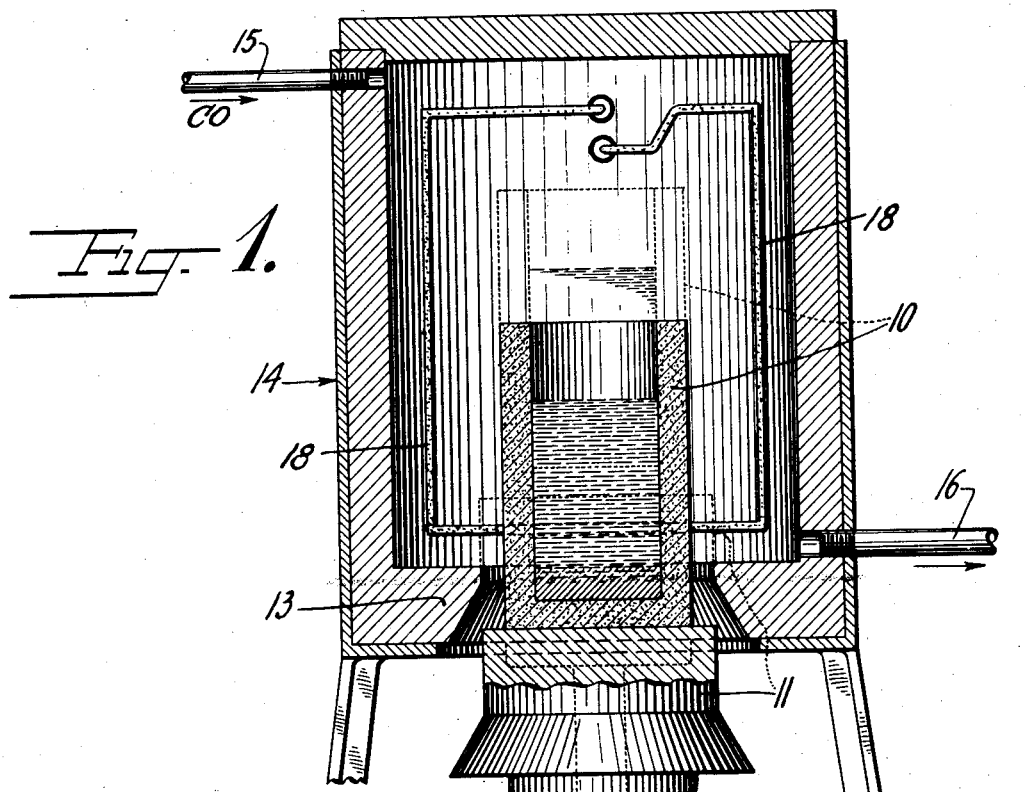
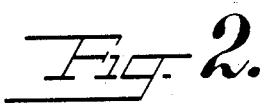
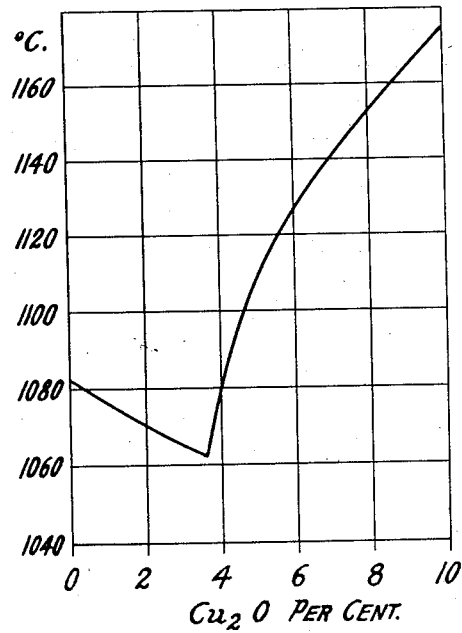
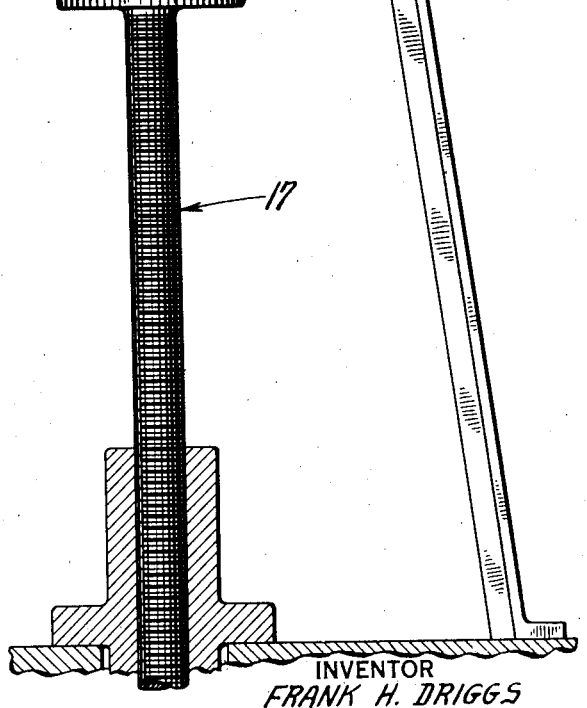
INVENTOR
FRANK H. DRIGGS
BY
ATTORNEY Patented Aug. 1, 1933

1,920,638

UNITED STATES PATENT OFFICE 1,920,638

METHOD OF PREPARING OXIDE FREE METAL CONTAINING NO VOIDS

Frank H. Driggs, Bloomfield, N. J., assignor to Westinghouse Lamp Company, a Corporation of Pennsylvania Application February 6, 1932. Serial No. 591,299

11 Claims. (Cl. 75—62)

This invention relates to a process of preparing a metal free from voids and substantially free from oxides. In its more specific aspect the invention is directed to the method of preparing a cuprous oxide free copper body containing no voids or cavities.

One of the methods heretofore proposed for forming a copper body substantially free from voids in the form of blow holes or pipes involves placing fragments of copper in a crucible located in a reverberatory furnace, heating the crucible and copper to a temperature above the fusion point of the latter and thereafter cooling the lower portion of the crucible while maintaining the upper portion thereof in a heated condition, so that the copper may freeze out or solidify in the direction of the upper end of the crucible.

According to this process as the copper freezes out any gases as such, that are contained therein move upwardly towards the liquidus portion of the mass. Thus because the freezing out occurs or takes place progressively upwardly the upper layer of the mass is in molten condition prior to freezing of the total mass thus allowing the trapped gases, which may have been in the molten metal, to be expelled therefrom before the freezing thereof.

Although this particular method may be suitable for forming copper structures that are free from voids, such as pipes or blow holes, the resultant product obtained thereby cannot be oxide free unless the original factor, and doubtful in that case, is oxide free copper. This statement may be best illustrated by reference to the copper-cuprous oxide equilibrium temperature diagram shown in Figure 2 of the drawing.

As a means of illustration, I may take copper having a cuprous oxide content greater than 3.6% and about 8%. This mass may be placed in a crucible and heated to a temperature sufficient to cause the same to become molten and fluid. This fluid mass is then cooled from the bottom progressively upwardly as heretofore proposed.

It is evident that as the lower portion of the mass becomes cooled to about 1150° C. that copper-cuprous oxide will freeze out and on further cooling the remaining mass then is progressively solidified and will contain cuprous oxide to an extent at least as great as and greater than the per cent in a copper-cuprous oxide eutectic mixture. Upon continued solidification the eutectic mixture is formed containing about 3.6% of cuprous oxide and the eutectic freezes out. Thus there is provided a structure having a plurality of what we might term increment layers containing progressively smaller quantities of cuprous oxide, with the quantity of cuprous oxide contained in each layer at least as great as the quantity of oxide, 3.6%, contained in the eutectic.

On the other hand if the original copper mass contains less than 3.6% cuprous oxide, and as for example 1.8%, is heated to about 1120° C., the copper will become fused and molten. When it is subjected to the same type of progressive cooling as that hereinbefore described a portion of the copper will at first separate out as an oxide free metal when cooled to a temperature at least as low as about 1083° C., which is the freezing point of pure copper.

Upon continued and further cooling it is apparent that as the copper freezes out as an oxide free mass, the oxide contained in the molten mass just prior to the freezing or solidification thereof is taken up by that portion of the heated melt which originally contained 1.8% of cuprous oxide. Thus the percentage of oxide contained in the liquidus phase continually increases because of the removal of the solvent therefrom during the freezing action or the formation of the solid phase.

This process, of progressively freezing the copper, continues until the percentage of cuprous oxide contained in the molten or liquidus phase, supported by the solidified copper or solid phase, is 3.6%. When this condition is established, this mass containing 3.6% of cuprous oxide, the eutectic mixture, freezes out en masse. Accordingly there is provided a solid structure, a portion of which is made up of pure copper, substantially free from cuprous oxide, blow holes and pipes, and an appreciable portion which contains 3.6% of cuprous oxide, the mass of the latter being about as great as that of said first portion.

Thus it is apparent that this process is inadequate for my purposes even when starting out with a metal containing less cuprous oxide than that present in a eutectic mixture, because the eutectic mixture which is frozen out and is contiguous with the oxide free copper must be removed therefrom so that the remaining oxide free copper is but a percentage of the total copper in the original mass.

One method heretofore proposed to provide a copper structure free from cuprous oxide involves treating a copper mass containing a lesser or greater amount of cuprous oxide than 3.6%, that contained in a eutectic mixture. This treatment contemplates placing the copper mass to be treated in a hydrogen furnace and in the presence of a reducing agent, hydrogen, heating the mass to an elevated temperature of sufficient magnitude to render the same molten.

This mass is maintained in this thermal state in the presence of the reducing agent until the copper of the cuprous oxide is reduced. Thereafter, the whole mass is allowed to cool to room temperature. Although oxide free copper is obtained by following this process, the oxide free copper body so obtained generally has a large number of blow holes or voids, sometimes simulating a honeycomb, as well as pipes or cavities.

In order that the disadvantages inherent in each of these two processes may be obviated and so that the advantages incident thereto may be attained, I have developed the present invention.

Briefly stated my invention is directed to a novel and unique process for the production of oxide free copper, free from blow holes or pipes, by treating a quantity of molten copper containing some cuprous oxide in the presence of a reducing agent, progressively cooling the copper in an upward direction while maintaining said reducing agent in contact with the molten metal in the sphere of elevated temperatures.

An object of my invention is to provide an efficient method for producing a substantially oxide free metal containing no blow holes or cavities.

Another object of my invention is to provide an efficient method for producing an oxide free copper metal containing no blow holes or pipes.

Another object of my invention is to provide an oxide free copper free from blow holes and pipes, the quantity of copper so produced being essentially the same as the quantity of copper in the original mass.

Another object of my invention is to provide a method for producing a cuprous oxide free copper containing no blow holes or cavities, with the crystals of copper preferentially orientated.

Other objects and advantages of my invention will become apparent from the following description taken in conjunction with the appended drawing.

Figure 1 represents a vertical cross sectional view with some of the parts in elevation of apparatus employed in carrying out my invention.

Figure 2 represents an equilibrium temperature diagram of copper-cuprous oxide.

It is well known that commercially "pure" copper contains oxygen, present in the form of cuprous oxide $Cu_2O$, sometimes to the extent of 1 to 2%. Although my invention finds ready application to a copper metal containing more than 3.6% of cuprous oxide, it will hereinafter be described merely as an illustration in connection with a copper metal containing less than 3.6% of cuprous oxide and, as for example 1.8%.

According to my invention the metal containing copper and cuprous oxide is placed in a crucible 10, preferably of graphite, resting upon a removable base 11 fitted in the bottom 13 of a furnace 14. Conduits 15 and 16 are located in the sides of the furnace 14 to admit and allow the expulsion of carbon monoxide therethrough.

Any suitable means, as for example, common glow bars 18 may be provided for heating the constituents within said furnace. After the copper to be treated and containing about 1.8% of cuprous oxide is placed in the furnace together with its graphite crucible, carbon monoxide or any other suitable reducing agent adapted for my purposes is admitted through the conduit 15. While the reducing agent, carbon monoxide, is contained therein, the furnace is heated so that the crucible together with its contained constituent, the copper containing cuprous oxide, is heated to a temperature sufficient to cause the metal to be converted from a solid to a liquid phase.

In practice I have found that such a metallic mass may be rendered sufficiently molten for my purposes by elevating its temperature to about 1150° C. The crucible together with its molten mass is allowed to remain in the furnace for an appreciable length of time so that at least a portion of the copper of the cuprous oxide may be reduced and preferably reduced so that the cuprous oxide limit is below 3.6%. The time necessary for this action is variable, depending upon a number of conditions among which are, the temperature of the molten mass, the amount of cuprous oxide present in the mass, the rate of contact of said molten mass with the reducing agent, as well as other factors.

Thereafter the crucible with its contained mass is slowly cooled in a progressively upward direction by slowly lowering the base 11 together with the crucible 10 and its contained mass into the air. While slowly lowering the crucible and its contained mass into the atmosphere the temperature within the furnace is maintained slightly above that necessary for keeping that portion of the mass within the furnace in a molten or liquidus condition.

One means I have found suitable for this purpose is to lower the crucible into the air at a rate of about $\frac{1}{8}$ of an inch per minute by rotating a screw jack 17, and while so lowering, maintaining the temperature approximately constant within the furnace to keep liquid that portion of the metal within the furnace containing cuprous oxide.

When carrying out this process, and in accordance with my invention the reducing agent, carbon monoxide, surrounding the greater portion of the molten mass, serves to reduce the cuprous oxide present therein and maintain the quantity of cuprous oxide present below 3.6%. As the crucible together with its contents is lowered into the atmosphere from the furnace at a slow rate the copper solidifies or freezes out as oxide free copper containing no blow holes or pipes. The quantity of cuprous oxide that may have been contained in that portion of the original molten mass which progressively freezes out is dissolved or in some other manner taken up by the liquidus phase thereabove. Any gases, as such, contained therein migrate upwardly into the liquidus phase and are finally expelled therefrom.

This molten or liquidus phase, resting on the solid oxide free copper is maintained at a temperature above the melting point of copper and probably containing a small proportion of cuprous oxide, is acted upon by the reducing agent, carbon monoxide, to prevent the building up of the cuprous oxide content therein to a percentage at least as great as that present in a eutectic mixture. Thus, as the copper freezes out as an oxide free copper, in progressive increments in the direction of cooling, the gas is expelled therefrom and any small proportion of cuprous oxide contained therein prior to solidification thereof is taken up by the melt or liquidus phase and is subsequently reduced by the reducing agent, carbon monoxide.

In accordance with the invention, the crucible, together with its metallic contents, is lowered into the atmosphere so as to progressively cool the same in an upward direction, while maintaining in a molten condition the top portion within the furnace and surrounded by the reducing means. This operation is carried out until the crucible is located entirely exteriorly of the furnace when the total mass is a solid phase of oxide free copper.

Thus according to this process any of the adsorbed or absorbed gases as well as the oxygen of the cuprous oxide contained in the original metal are eliminated therefrom so that the resultant mass is an oxide free homogeneous copper mass free from blow holes or pipes, with the crystals having a preferred orientation.

My invention besides having the advantages of providing a copper element, which may be in the form of an ingot, free from cuprous oxide and containing no blow holes or pipes, also provides a copper element whose crystals have their major axes extending in the direction of cooling.

Although I have described a gaseous reducing agent surrounding the melt during the practice of my invention, it is within the purview of the invention to employ for the same purpose a solid reducing agent, as for example calcium, boron or the like. When calcium, boron or the like is employed as the reducing medium, it is added directly to the copper and the ambient atmosphere within the furnace is preferably composed of a gas, such as nitrogen, or the like inert to copper. The invention is susceptible to a variety of modifications and is to be limited only by the prior art.

What is claimed is:

1. The method of producing an oxide free metallic body substantially free from voids comprising, fusing a metallic mass containing a quantity of oxide adapted to form a eutectic mixture with the metal of said mass, progressively solidifying said mass in a preferred direction while maintaining a portion thereof in a molten condition, reducing the oxide present in said molten portion, said progressive solidification taking place in said preferred direction with the portion of said mass at the forward side of said direction being the last increment thereof to solidify and during substantially the entire solidification step maintaining the quantity of oxide present in said molten portion below that in a eutectic of the metal and its oxide.

2. The method of producing an oxide free metallic body containing no voids comprising, heating a metallic mass containing an oxide adapted to form a eutectic with the metal of said mass to convert the same from a solid phase to a liquid phase, progressively cooling said liquid phase in a preferred direction to progressively change the same in that direction from a liquid phase to a solid phase, maintaining a portion of said liquid phase unchanged as to phase during a period of the progressive phase change, said progressive phase change taking place in said preferred direction whereby the solid phase is free from voids, and during substantially the entire period of phase change from the liquid to the solid phase maintaining the oxide limit of said liquid phase substantially below the oxide present in a eutectic mixture of the metal and its oxide.

3. The method of producing an oxide free metallic body containing no voids, comprising heating a metallic mass containing an oxide adapted to form a eutectic with the metal of said mass to fuse the same, reducing some of the metal oxide contained therein, cooling the same in a preferred direction while maintaining a portion thereof in a molten condition and in contact with a reducing agent, said preferred direction being towards one limit of the molten mass through which a gas that may be contained therein may be expelled therefrom, said solidification taking place slowly in said preferred direction to allow gases to be expelled in the direction of cooling, and during substantially the entire cooling maintaining the oxide limit of the molten mass below the oxide present in a eutectic mixture of the metal and its oxide.

4. The method of producing an oxide free metallic body containing no voids, comprising placing in a container a body of metal containing an oxide adapted to form a eutectic with said metal, raising the temperature of the body to fuse the same, maintaining said fused body in contact with a reducing agent, slowly and progressively cooling said container and its contents in a direction from its base upwardly while still supplying heat to the remaining portion of the container so that the topmost layer of the metal shall be the last to solidify, said reducing agent being in contact with said molten product throughout the cooling step, and during substantially the entire cooling maintaining the oxide limit of said molten mass below the oxide present in a eutectic mixture of the metal and its oxide.

5. The method of producing a cuprous oxide free copper body substantially free from voids, comprising fusing a metallic copper mass, progressively solidifying said mass in a preferred direction while maintaining a portion thereof in a molten condition, reducing the cuprous oxide present in said molten portion, said progressive solidification taking place in said preferred direction with a portion of said mass on the forward side of said direction being the last increment thereof to solidify and maintaining the quantity of oxide present in said molten mass below 3.6% during substantially the entire solidification operation.

6. The method for producing an oxide-free copper body containing no voids, comprising heating a copper body containing cuprous oxide to convert the same from a solid phase to a liquid phase, progressively cooling said liquid phase in a preferred direction to progressively change the same in that direction from a liquid phase to a solid phase, maintaining a portion of the liquid phase unchanged as to phase during the progressive phase change, said progressive phase change taking place in said preferred direction whereby the solid phase is cuprous-oxide free copper containing no cavities and during substantially the entire period of phase change from the liquid to the solid phase maintaining the quantity of cuprous oxide in the molten portion substantially below that present in a copper-cuprous oxide eutectic.

7. The method of producing a cuprous oxide free copper body containing no voids, comprising heating a copper mass to fuse the same, reducing the metal of the oxide contained therein, cooling said mass in a preferred direction to solidify an oxide free copper containing no voids while maintaining a portion thereof in a molten condition and in contact with a reducing agent, said preferred direction being towards one limit of the molten mass, said solidification taking place slowly in said preferred direction and maintaining the cuprous oxide content below 3.6% during substantially the entire cooling step.

8. The method of producing a cuprous oxide free copper body containing no voids, comprising placing a body of copper in a container, raising the temperature of said copper body to fuse the same, maintaining said fused body in contact with a reducing agent, slowly and progressively cooling the said container and its contents in a direction from its base upwardly while still supplying heat to the upper portion of the container so that the topmost layer of copper in the container shall be the last to solidify, maintaining the oxide content of the molten portion substantially below the oxide present in a eutectic mixture during substantially the entire cooling operation.

9. The method of producing a cuprous oxide free copper body containing no voids, comprising cooling a fused body of copper in a container and in the presence of a reducing agent, said cooling taking place in a preferred direction upwardly from the base of the container while maintaining during substantially the entire cooling operation the upper portion of the copper body in a molten condition and its cuprous oxide limit below that present in a copper cuprous oxide eutectic, the copper solidifying in progressive increments from the base upwardly with the top layer being the last increment solidifying.

10. The method of producing a cuprous oxide free copper containing no voids, comprising progressively cooling a body of molten copper contained in a suitable mold, cooling the mold from its base upwardly while still supplying heat to the upper portion of the mold to maintain the topmost layer thereof in a molten condition and so that it shall be the last to solidify, said molten portion being in contact with a reducing agent during the cooling step and maintaining the cuprous oxide content of said mass below 3.6% during substantially the entire cooling step.

11. The method of producing a cuprous oxide free copper containing no voids, comprising cooling a body of molten copper contained in a graphite mold, surrounding said mold with carbon monoxide gas to reduce the cuprous oxide present in said molten copper, slowly and progressively cooling said molten mass from its base upwardly while still supplying heat to the upper portion of said mass to retain the upper portion thereof in a molten condition and so that the topmost layer shall be the last to solidify, and maintaining the oxide content of the cuprous oxide in the molten portion below the quantity of cuprous oxide present in a eutectic mixture.

FRANK H. DRIGGS.